United States Patent

Wessel et al.

[11] Patent Number: 4,658,271
[45] Date of Patent: Apr. 14, 1987

[54] ELECTROOPTICAL RECORDING DEVICE

[75] Inventors: Gerhard Wessel, Stuttgart; Heinz Ebner, Ditzingen, both of Fed. Rep. of Germany

[73] Assignee: Standard Elektrik Lorenz Aktiengesellschaft, Stuttgart, Fed. Rep. of Germany

[21] Appl. No.: 796,040

[22] Filed: Nov. 6, 1985

[30] Foreign Application Priority Data

Nov. 6, 1984 [DE] Fed. Rep. of Germany ....... 3440406

[51] Int. Cl.$^4$ .......................... G01D 9/42; G02F 1/07
[52] U.S. Cl. .................. 346/107 R; 350/356
[58] Field of Search ............ 346/107 R, 108; 350/353, 355, 356

[56] References Cited

U.S. PATENT DOCUMENTS 4,370,030 1/1983 Sprague ............................ 350/356
4,560,994 12/1985 Sprague ............................ 346/108

FOREIGN PATENT DOCUMENTS 0100830 6/1983 Japan ................................. 350/353

Primary Examiner—E. A. Goldberg
Assistant Examiner—Mark Reinhart
Attorney, Agent, or Firm—T. L. Peterson

[57] ABSTRACT

An electrooptical recording device for recording image information in an optical printer having a light source, an electrooptical switch and a recording medium and further including an electrode array having a plurality of central electrodes and associated external electrodes for controlling a plurality of N recording spots by half the number of driver stages. The recording spots are light sensitive and lie along a recording line and are exposed to the light source when a voltage is applied to a select pair of the electrodes deposited on the optically active material causing the electrooptical switch to change from an opaque to a transparent state. By controlling the operation of each pair of electrodes, the pattern of recording spots that are exposed is controlled.

1 Claim, 6 Drawing Figures

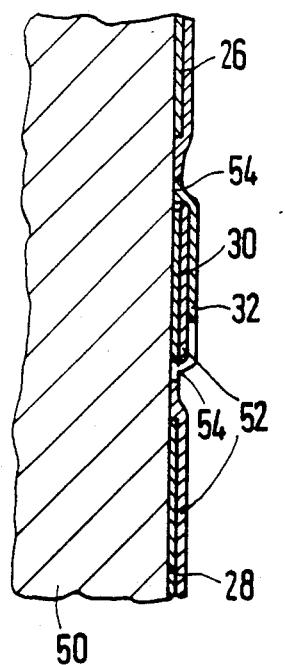
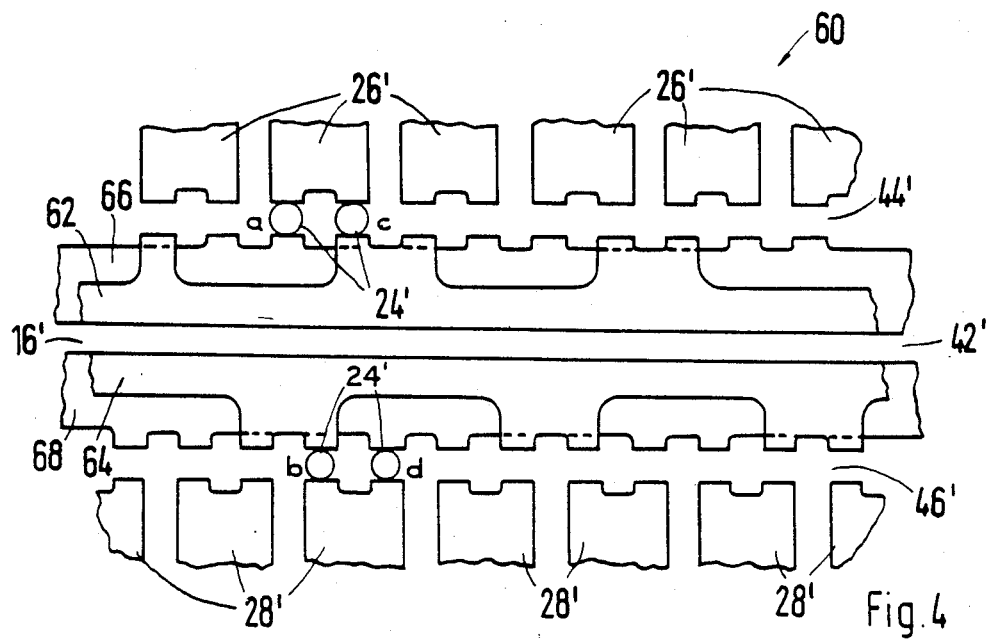

ELECTROOPTICAL RECORDING DEVICE

BACKGROUND OF THE INVENTION

Field of the Invention

The invention relates generally to recording devices and more particularly to an electrooptical recording device for recording image information line by line.

DESCRIPTION OF THE PRIOR ART

In the field of the recording devices, an electrooptical recording device of the type described herein is known. A discussion of such a recording device may be found in the German patent publication No. DE-OS 31 13 293 which describes the recording device as an essential functional unit in an optical printer. The electrooptical recording device of the prior art comprises an electrooptical switch, a light source and a recording medium.

The electrooptical recording device of the prior art comprises an electrooptical switch having a layer o optically active material which is changed from an optically isotropic state to an optically anisotropic state (doubly refracting) by applying an electric field. If linearly polarized light passes through the doubly refracting material, the plane of polarization of the light is rotated. If a polariser and an analyzer are mounted, respectively, before and behind the doubly refracting material, a device is obtained which can be employed as an electrooptical switch. A recording spot for recording image information is exposed by applying a voltage to a pair of electrode deposited on the optically active material. The electric field established alters the optical active material from the optically isotropic state to the doubly refracting state. The electrooptical switch becomes transparent for this reading spot.

A problem exists in the application of the electric field. In an optical printer the recording medium is usually exposed line by line and thus the electrooptical switch must be constructed as a line. however, high resolution is required which necessitates a narrowly spaced electrode array through which the electric field is applied. These electrodes are deposited by thin-film and thick-film techniques. With the known optically active material of the prior art, a minimum electrode spacing and a minimum electrode width are required to ensure proper operation. The known recording device mentioned above permits a resolution of eight spots per millimeter. In the prior art device, each electrode pair is energized via a separate driver requiring a greater number of transistors. Since the probability of failure increases with the number of components, high-resolution electrooptica switches are susceptible to failure. If a single spot element of the recording device fails, the entire recording device has to replaced.

SUMMARY OF THE PRESENT INVENTION

It is therefore an object of the present invention to provide an improved electrooptical recording device requiring half the number of driver stages.

It is a further object to provide an improved electrooptical recording device having larger driver stages.

It is a further object to provide an improved electrooptical recording device having twice the functional reliability.

Briefly, a preferred embodiment of the present invention includes an electrooptical recording device for recording image information in an optical printer on a line by line basis and includes a light source, an electrooptical switch and a recording medium. The switch includes a layer of optically active material and the electrooptical recording device includes an electrode array for permitting a plurality of N recording spots to be controlled by half the number of driver stages. The electrode array consists of two superposed central electrodes and associated external electrodes. The recording medium includes a plurality of recording spots or elements which are light sensitive and lie along a recording line. Exposure of a recording spot to the light source occurs when a voltage is applied to a select pair of the central electrodes and the associated external electrodes deposited on the optically active material causing the electrooptical switch to change from an opaque to a transparent state. Each external electrode and the two central electrodes control two recording spots and thus by controlling the operation of each pair of electrodes, the pattern of recording spots that are exposed is controlled. In a construction of a doubly refracting substrate, an insulating film is employed to electrically isolate the central electrodes for one another and acts as an antireflection medium which does not require an additional deposition step.

A plurality of altlernative embodiments are disclosed which employ four central electrodes for providing perfect electric isolation between a first optical line and a second optical line permitting recording corrections and resolution modifications. Further, optical writing on less sensitive recording media is permitted without increasing the exposure time or light intensity. An additional alternative embodiment permits the deposition of the upper central electrodes deposited on the insulating film on the substrate without touching the lower central electrodes.

An advantage of the electrooptical recording device of the present invention is that half the number of driver stages are required.

Another advantage is that the electrooptical recording device incorporates larger driver stages.

A further advantage is that the driver stages of the electrooptical recording device have twice the functional reliability.

These and other objects and advantages of the present invention will no doubt become obvious to those of ordinary skill in the art after having read the following detailed description of the preferred embodiment(s) which are illustrated in the various drawing figures.

IN THE DRAWING

FIG. 3 is a partial cross-sectional view taken along a line 3—3 of FIG. 2;

FIG. 4 is a partial plan view of a first alternative embodiment of the electrode array;

DETAILED DESCRIPTION OF THE PREFERRED EMBODIMENT

Figure 1:
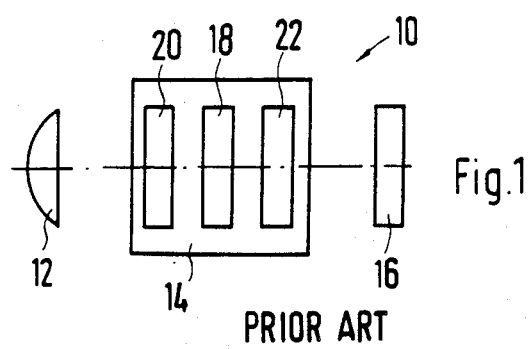
FIG. 1 is a schematic diagram of an electrooptical recording device of the prior art.

FIG. 1 illustrates an electrooptical recording device of the prior art and referred to by the general reference character 10. The recording device 10 includes a light source 12, an electrooptical switch 14 and a recording medium 16. The electrooptical switch 14 further includes a layer 18 of optically active material such as lead lanthanum zirconate titanate (PLZT) ceramic, a polarizer 20 and an analyzer 22. The electrooptical switch 14 includes the optically active layer 18 which changes from an optically isotropic state to an optically anisotropic state by the application of an electric field. When the layer 18 is optically anisotropic, the PLZT ceramic material the layer 18 is doubly refracting. If linearly polarized light passes through the doubly refracting layer 18, the plane of polarization of the light is rotated. If the polarizer 20 and the analyzer 22 are mounted respectively in front of and behind the doubly refracting layer 18, a device is obtained which can be employed as the electrooptical switch 14. One of a plurality of recording spots 24 (shown in FIG. 2) is exposed by applying a voltage to a designated pair of electrodes selected from a first plurality of external electrodes 26, a second plurality of external electrodes 28, a first central electrode 30 and a second central electrode 32 (each shown in FIG. 2) which are deposited on the layer 18. The electric field established alters the optically active layer 18 from the optically isotropic state to the doubly refracting state. The electrooptical switch 14 becomes transparent for this recording spot of the plurality of recording spots 24. In an optical printer device, the recording medium 16 is normally exposed line by line necessitating the electrooptical switch 14 to be constructed as a line. Also, high resolution is required necessitating a narrowly spaced electrode array 40 through which the electric field is applied. The electrode array 40 is deposited by thin-film or thick-film techniques and with the optically active layer 18 comprised of PLZT ceramic, a minimum electrode spacing and a minimum electrode width are required to ensure proper operation. The electrooptical recording device 10 permits a resolution of eight spots per millimeter. Each electrode pair comprised of first and second pluralities of external electrodes 26, 28 and first and seciond pluralities of central electrodes 30, 32 is energized by a separate driver circuit (not shown) requiring a large number of transistor components resultin in an increased probability of failure. If a single recording spot of the plurality of recording spots 24 fails, the entire electrooptical recording device 10 has to be replaced.

Figure 2:
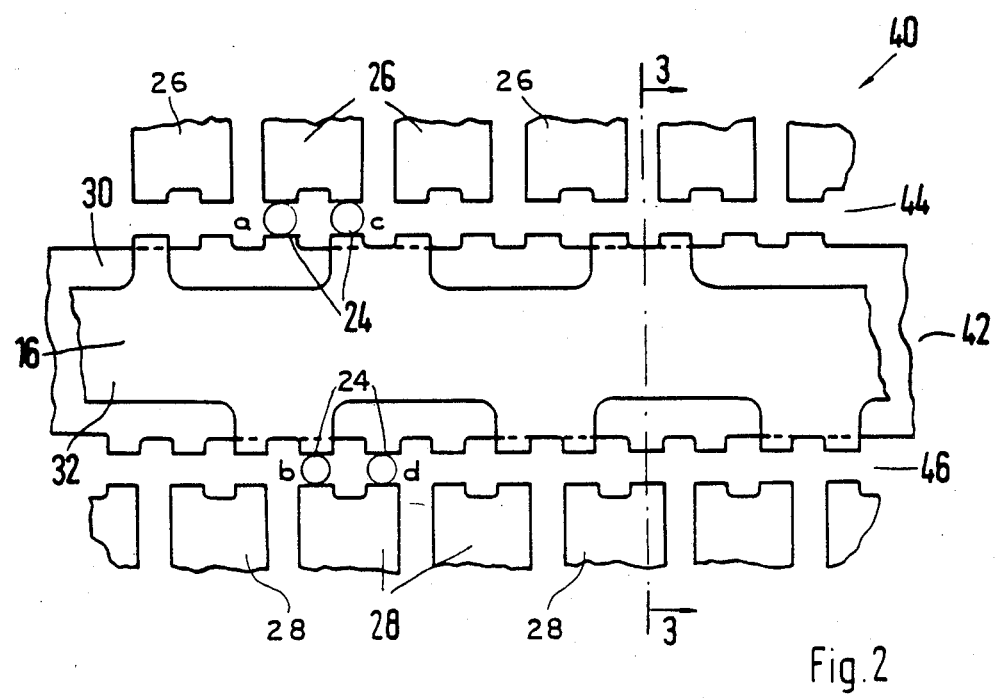
FIG. 2 is a partial plan view of an electrode array of a recording device in accordance with the present invention.

FIG. 2 illustrates the electrode array 40 of the electrooptical recording device 10 and incorporating the present invention. The electrode array 40 includes a recording line 42, a first optical line 44, a second optical line 46, the plurality of recording spots comprising spots a, b, c and d, the first plurality of external electrodes 26, the second plurality of external electrodes 28, the first central electrode 30 and the second central electrode 32. The recording line 42 is exposed through the first optical line 44 and the second optical line 46. The four recording spots a, b, c and d of the plurality of recording spots 24 are controlled by one of the first plurality of external electrodes 26, one of the second plurality of external electrodes 28, the first central electrode 30 and the second central electrode 32. One of the first plurality of external electrodes 26, the first central electrode 30 and the second central electrode 32 control the recording spots a and c. Conversely, one of the second plurality of external electrodes 28, the first central electrode 30 and the second central electrode 32 control the recording spots b and d. Recording spot 6 is located between the spots a and c but laterally displaced on the recording medium 16. The recording spot d follows spot c but is on the same side of the recording medium 16. The recording spot d follows spot c but is on the same side of the recording medium 16 as spot b. Recording spot a is exposed if voltage is applied between one of the first plurality of external electrodes 26 and the first central electrode 30 with spots b, c and d being exposed correspondingly. Recording spot c is exposed if a voltage is applied between one of the first plurality of external electrodes 26 and the second central electrode 32. Recording spot b is exposed if a voltage is applied between one of the second plurality of external electrodes 28 and the second central electrode 32 while recording spot d is exposed if a voltage is applied between one of the second plurality of external electrodes 28 and the first central electrode 30. Thus, the electrode array 40 permits N recording spots 24 to be controlled with half the number of driver stages (not shown) as in conventional arrangements.

FIG. 3 is a sectional view of FIG. 2 which illustrates part of a doubly refracting substrast identified by the numeral 50. The first external electrodes 26, the second external electrodes 28 and the first central electrode 30 are each deposited directly on the substrate 50. An insulating film 52 covers the first and second external electrodes 26, 28 and the first central electrode 30 and nearly the entire surface of the substrate 50. A plurality of small windows 54 exist in those areas where the second central electrode 32 is in direct contract with the substrast 50. The primary function of the insulating film 52 is to electrically isolate the first central electrode 30 from the second central electrode 32. The thickness of the insulating film 52 is chosen so that at the recording spots a, b, c and d of the plurality of recording spots 24, the film 52 acts as a quarter wavelength ($\lambda/4$) film where $\lambda$ is the relative wavelength of the light emitted by the light source 12. The film 52 is thus an antireflection film which does not have to be deposited as an additional film as in conventional arrangements.

FIG. 4 illustrates a first alternative embodiment of a electrode array of the present invention and referred to by the general reference character 60. Elements common with those of the electrode array 40 of FIG. 2 are identified by a prime designation. Electrode array 60 of the electrooptical recording device 10 includes a plurality of four central electrodes including a first upper central electrode 62, a second upper central electrode 64, a first lower central electrode 66 and a second lower central electrode 68 which replace the first and second central electrodes 30, 32 of FIG. 2. This construction provides perfect electric isolation between the first optical line 44' and the second optical line 46' which makes it possible to correct any slips in the transport of the recording medium 16' or any flutter of a drum plotter (not shown). Additionally, the electric isolation between the first optical line 44' and the second optical line 46' permits the resolution to be change, for example, from either recording spots per millimeter to four recording spots per millimeter. The result is a shorter data transmission time in digital systems if the recoding spots a and b and the recording spots c and d are exposed together such that each of the two pairs of recording spots forms only one spot.

Figure 5:
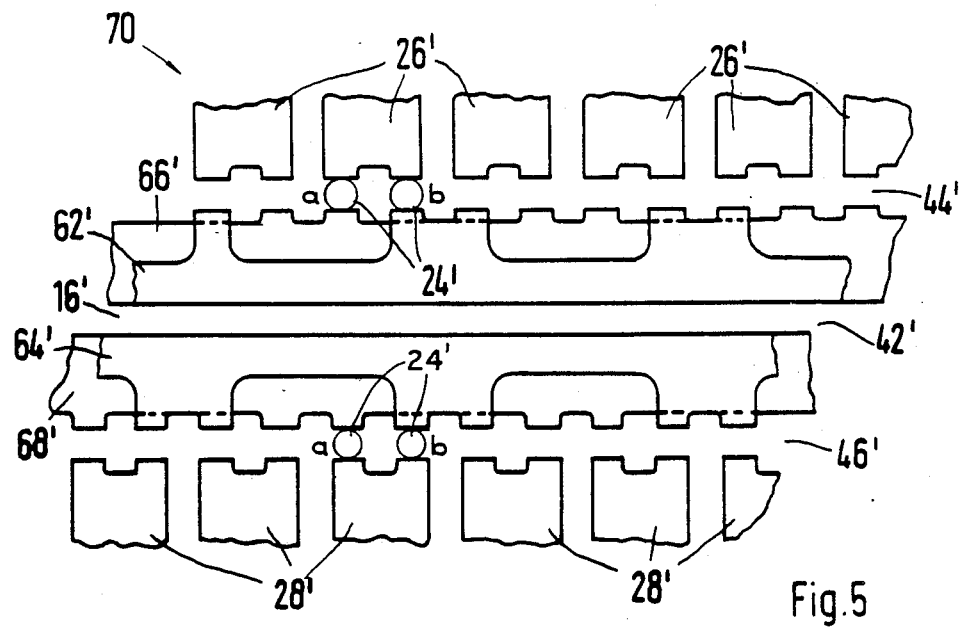
FIG. 5 is a partial plan view of a second alternative embodiment of the electrode array.

FIG. 5 illustrates a second alternative embodiment of the electrode array of the present invention and referred to by the general reference character 70. Elements common with those of the electrode arrays 40 and 60 of FIGS. 2 and 4 are identified by a prime designation. Electrode array 70 of the electrooptical recording device 10' permits optical writing on a less sensitive recording media 16' without increasing the exposure time or the light intensity. Compared with the foregoing preferred embodiment 40 of FIG. 2 and the first alternative embodiment 60 of FIG. 4, the first optical line 44' and the second optical line 46' are shifted with respect to one another by one recording spot 24'. The original four recording spots a, b, c and d now form only two recording spots a and b which are present twice. This construction doubles the effective exposure time without increasing the printing time.

Figure 6:
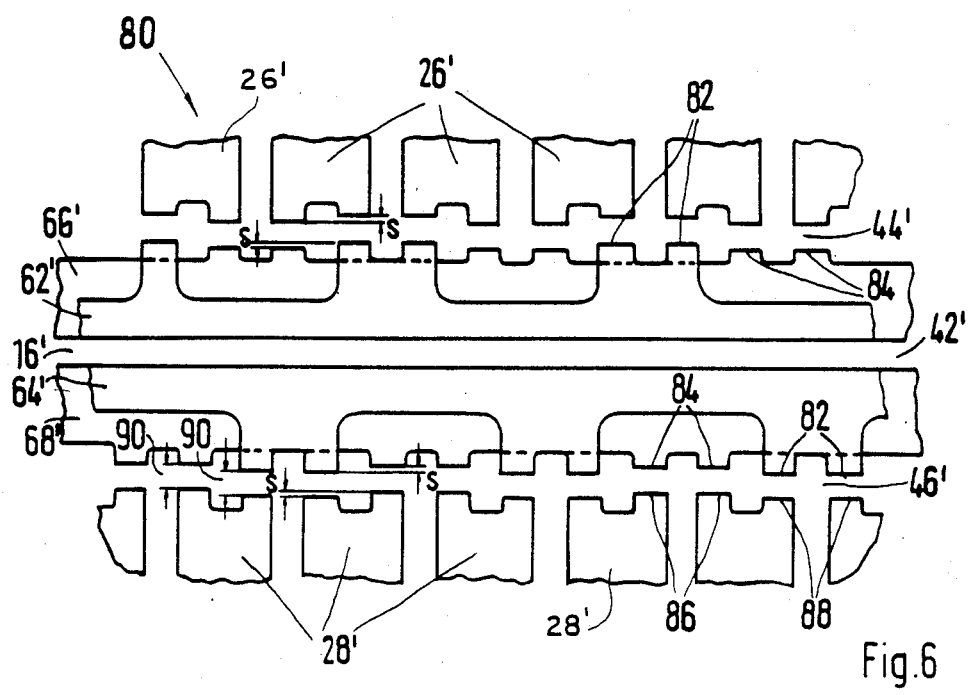
FIG. 6 is a partial plan view of a third alternative embodiment of the electrode array.

FIG. 6 illustrates a third alternative embodiment of the electrode array of the present invention and referred to by the general reference character 80. Elements common with those of the electrode arrays 40, 60 and 70 of FIGS. 2, 4 and 5 are identified by a prime designation. Electrode array 80 of the electrooptical recording device 10' includes the four central electrodes of the electrode array of FIG. 4 comprising the first upper central electrode 62', the second upper central electrode 64', the first lower central electrode 66' and the second lower central electrode 68'. A plurality of electrode ends including an upper electrode end of tip 82 associated with the first and second upper central electrodes 62', 64', a lower central electrode end or tip 84 associated with the first and second lower central electrode 66', 68' and an upper external electrode tip 86 and a lower external electrode tip 88 each associated with the first and second plurality of external electrodes 26', 28'. The electrode tips 82, 84, 86 and 88 determine which recording spot 24' is selected for voltage application. The upper electrode tips 82 of the first and second upper central electrodes 62', 64' project beyond the lower electrode tips 84 of the first and second lower central electrodes 66', 68' by a distance "s". The corresponding upper external electrode tips 86 and the lower external electrode tips 88 of the first and second plurality of external electrodes 26', 28' are offset by the same distance "s" which results in a uniform distance 90 between opposite tips. Exposing a recording spot 24' in the second optical line 46' requires the second upper earlier than the second lower central electrode 68' is energized. The unit of time is defined as $$t = s/v \tag{1}$$

where
t = time
s = distance, and
v = the feed speed of the recording medium 16'.

The first optical line 44' is correspondingly controlled. The result is that all recording spots 24' of the recording line 42' are the same level. The advantage of this arrangement lies in the deposition of the first and second upper central electrodes 62', 64' which are deposited on the insulating film 52 (see FIG. 3) and directly on the substrate 50 through the small windows 54 without touching the first and second lower central electrodes 66', 68'. This arrangement leaves sufficient space in critical areas simplifying the manufacture of the electrooptical recording device 10'.

Although the present invention has been described in terms of the presently preferred embodiment(s), it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An electrooptical recording apparatus for recording image information on a line by line format comprising, in combination:

an electrically controllable optical component having a plurality of spot elements from which light impinges as a plurality of spots onto a plurality of recording spots on a recording medium along the length of a recording line;

an electrooptical switch with the recording apparatus having a layer of optically active material;

an electrode array within the recording apparatus having a plurality of central electrodes comprised of an upper central electrode and a lower central electrode vertically communicating with each cooperating with a plurality of external electrodes for controlling one of said recording spots; and an insulating film placed within the electrode array and intermediate said upper central electrode and said lower central electrode for isolating said central electrodes, the electrode array providing control of N of said recording spots by employing N/2 driver stages.

* * * * *